Patented July 10, 1951

2,560,049

UNITED STATES PATENT OFFICE 2,560,049

ALKYLPHENOL SULFOXIDES

Wendell S. Cook, Houghton, Mich., assignor to The Firestone Tire & Rubber Company, Akron, Ohio, a corporation of Ohio No Drawing. Application June 29, 1949, Serial No. 102,153

1 Claim. (Cl. 260—607)

This invention relates to alkylphenol sulfoxides.

These new compounds are believed to have the following type formula

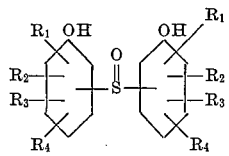

where $R_1$, $R_2$, $R_3$, and $R_4$ consist of a hydrogen atom or an alkyl group, at least one of said $R_1$, $R_2$, $R_3$, and $R_4$ being an alkyl group.

The compounds may be conveniently prepared by oxidizing the sulfur linkage of a corresponding bis (alkylphenol) sulfide by controlled reaction of the latter substance with a suitable oxidizing agent as for example, hydrogen peroxide.

The following specific examples are given in further illustration of the invention.

Example 1

A sample of 71.6 grams of bis (6-tert-butyl-3-methylphenol) sulfide was dissolved in 800 cc. of glacial acetic acid. To this solution 24 grams of thirty percent hydrogen peroxide were added and the resulting reaction mixture was allowed to stand seven days. The mixture was then diluted to 2 liters and the resulting precipitate was filtered and recrystallized twice from methanol to produce 59 grams of white crystalline material having a melting point of 179° C.

The following analysis indicates the substance to be the sulfoxide of the starting material:

|  | Per cent calculated for $C_{22}H_{30}O_3S$ | Per cent found |
|---|---|---|
| Sulfur | 8.56 | 8.31 |
| Carbon | 70.60 | 70.45 |
| Hydrogen | 8.00 | 7.94 |

Example 2

A sample of 23.5 grams of bis (4,6-di-tert-butyl-3-methylphenol) sulfide was dissolved in 4 liters of hot acetic acid. The resulting solution was cooled and 5.6 grams of thirty percent hydrogen peroxide were added. On proceeding as in Example 1 above, a yellow crystalline material was obtained having a melting point of 163° C. That this material was the sulfoxide was indicated by the following analytical results:

|  | Per cent calculated for $C_{30}H_{46}O_3S$ | Per cent found |
|---|---|---|
| Sulfur | 6.58 | 6.58 |

Mono-, di-, tri-, and tetra-alkyl phenol sulfoxides may be prepared in the manner illustrated above. Additional examples of the invention are as follows:

Bis (4,6-dimethylphenol) sulfoxide
Bis (3,4,6-trimethylphenol) sulfoxide
Bis (3,4,5,6-tetramethylphenol) sulfoxide
Bis (4,6-diethylphenol) sulfoxide
Bis (3,4-dioctylphenol) sulfoxide
Bis (4-methyl-6-octylphenol) sulfoxide
Bis (3,5-dimethylphenol) sulfoxide The above examples are illustrative of the compounds which may be prepared, but the invention is not limited thereto. So too, the compounds of this invention may be prepared by other methods as, for example, by reacting a phenol having the desired degree of alkylation with thionyl chloride.

What is claimed is:

Bis (4,6-di-tert-butyl-3-methylphenol) sulfoxide.

WENDELL S. COOK.

REFERENCES CITED

The following references are of record in the file of this patent:

UNITED STATES PATENTS

| Number | Name | Date |
|---|---|---|
| 2,385,899 | Weijlard et al. | Oct. 2, 1945 |
| 2,402,448 | Richards | June 18, 1946 |
| 2,499,822 | Gilbert et al. | Mar. 7, 1950 |

OTHER REFERENCES

Gazdar et al.: Jour. Chemical Soc. (London), vol. 97, page 2250 (1910).